United States Patent
Lim et al.

(10) Patent No.: US 12,058,429 B2
(45) Date of Patent: Aug. 6, 2024

(54) LENS, LENS ASSEMBLY, AND MOBILE ELECTRONIC DEVICE

(71) Applicant: SAMSUNG ELECTRO-MECHANICS CO., LTD., Suwon-si (KR)

(72) Inventors: Eun Jung Lim, Suwon-si (KR); Jung Hyun Lee, Suwon-si (KR); Chang Hyun Yoon, Suwon-si (KR); Young O Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 177 days.

(21) Appl. No.: 17/830,657

(22) Filed: Jun. 2, 2022

(65) Prior Publication Data

US 2023/0199292 A1 Jun. 22, 2023

(30) Foreign Application Priority Data

Dec. 20, 2021 (KR) ........................ 10-2021-0182706

(51) Int. Cl.
   *G02B 3/02* (2006.01)
   *G02B 1/00* (2006.01)
   *G06F 1/16* (2006.01)
   *H04N 23/55* (2023.01)

(52) U.S. Cl.
   CPC ............ *H04N 23/55* (2023.01); *G02B 1/002* (2013.01); *G02B 3/02* (2013.01); *G06F 1/1686* (2013.01); *G02B 2207/101* (2013.01)

(58) Field of Classification Search
   USPC ....................................................... 396/439
   See application file for complete search history.

(56) References Cited

U.S. PATENT DOCUMENTS

| 10,416,354 | B2 * | 9/2019 | Takai ................... G02B 5/0278 |
| 2017/0101538 | A1 | 4/2017 | Kubo et al. |
| 2017/0176644 | A1 * | 6/2017 | Nakayama .............. B32B 27/20 |
| 2021/0057464 | A1 * | 2/2021 | Lee ..................... H01L 27/1463 |

FOREIGN PATENT DOCUMENTS

| JP | 2010-144137 A | 7/2010 |
| JP | 6501506 B2 | 4/2019 |
| KR | 10-2017-0009826 A | 1/2017 |
| KR | 10-1787215 B1 | 10/2017 |
| TW | 200408901 A | 6/2004 |
| WO | WO 2014/206756 A1 | 12/2014 |

OTHER PUBLICATIONS

Taiwanese Office Action issued on May 30, 2023, in counterpart Taiwanese Patent Application No. 111120564 (6 pages in English, 7 pages in Chinese).

* cited by examiner

*Primary Examiner* — Clayton E. LaBalle
*Assistant Examiner* — Warren K Fenwick
(74) *Attorney, Agent, or Firm* — NSIP Law

(57) ABSTRACT

A lens is provided. The lens includes a lens unit, and a serrated layer disposed on at least a portion of a surface of the lens unit, wherein the serrated layer includes a plurality of particles dispersed therein that are injected into the serrated layer. The serrated layer includes a plurality of conical structures having different sizes, accordingly, a refractive index on the surface of the serrated layer may gradually change.

22 Claims, 10 Drawing Sheets

A

LENS, LENS ASSEMBLY, AND MOBILE ELECTRONIC DEVICE

CROSS-REFERENCE TO RELATED APPLICATIONS

This application claims the benefit under 35 USC § 119(a) of Korean Patent Application No. 10-2021-0182706 filed on Dec. 20, 2021, in the Korean Intellectual Property Office, the entire disclosure of which is incorporated herein by reference for all purposes.

BACKGROUND

1. Field

The following description relates to a lens, a lens assembly, and a mobile electronic device.

2. Description of Related Art

As the functions of cameras in mobile electronic devices such as, but not limited to mobile phones, tablet PCs, laptops, and similar devices, have advanced, the technology of lenses implemented therein has also advanced. Lenses may collect or disperse light, and, by implementing this function, a lens may enlarge or reduce the size of an image, and a representative function of a lens may utilize linear travelling and refractive properties of light. By implementing the functions described above, an amount of image of light passing through the lens may be enlarged or reduced. Additionally, when a lens is implemented, the field of view may be different from an actual field of view, and accordingly, a lens which may capture a wider or further magnified image than the actual image as viewed by the human eye may be implemented. However, when light is refracted, light may not converge on a single point, and may be spread or may be distorted. This phenomenon may be known as aberration. Due to aberration, images of a lens may be distorted when images are captured, and sharpness may be affected, such that image resolution may degrade. To address this issue, a combination of various lenses may be used, and by combining various lenses implemented in a camera, aberration may be calibrated.

However, light incident to a lens may cause internal reflection on a surface or an internal wall of the lens. Such light may cause a flare phenomenon on the screen, and to prevent such a phenomenon, it may be necessary to minimize light transmittance and light reflectance in the visible ray region.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a lens includes a lens unit; and a serrated layer disposed on at least a portion of a surface of the lens unit, wherein the serrated layer comprises a plurality of particles dispersed therein.

The serrated layer may include a nano-serration structure.

the serrated layer may include a plurality of conical structures having different sizes.

The serrated layer may include an irregularly shaped serrated structure.

The serrated layer may include a porous structure.

The plurality of particles may include nanoparticles.

The plurality of particles may include ceramic particles.

The ceramic particles may include $ZrO_2$ particles.

The lens may further include an adhesive layer disposed between the lens unit and the serrated layer.

The adhesive layer may include at least one of $SiO_2$, $TiO_2$, and a silane compound.

The lens unit and the serrated layer may be configured to be integrated with each other.

The serrated layer may include at least one of $Al_2O_3$ and $SiO_2$.

In a general aspect, a lens assembly includes at least one lens including a lens unit, wherein at least one of the at least one lens is configured as a low-reflection lens, and wherein a serrated layer comprising a plurality of particles dispersed therein is disposed on at least a portion of a surface of the lens unit.

The low-reflection lens may be disposed on an outermost side of the lens assembly among the at least one lens in an optical axis direction.

The low-reflection lens may include a first surface and a second surface opposing the first surface, and the serrated layer is disposed on the first surface and is not disposed on the second surface.

The low-reflection lens is disposed such that the second surface is disposed on an external side of the lens assembly in the optical axis direction.

The lens assembly may further include a plurality of the low-reflection lenses, and the plurality of the low-reflection lenses are disposed on an outermost side of the lens assembly among the at least one lens in an optical axis direction.

In a general aspect, a mobile electronic device includes a display; and a lens assembly, wherein the lens assembly includes at least one lens including a lens unit, and wherein at least one of the at least one lens is configured as a low-reflection lens, and a serrated layer including a plurality of particles dispersed therein is disposed on at least a portion of a surface of the lens unit.

The low-reflection lens may be disposed on an outermost side of the lens assembly in an optical axis direction of the at least one lens.

The lens assembly may be covered by the display.

The lens assembly may be covered by a tempered glass portion of the display.

In a general aspect, a lens assembly includes a plurality of lens; wherein at least one of the plurality of lens is configured as a low reflection lens, wherein the low reflection lens comprises a first uneven layer disposed on a first surface of the low reflection lens, and a second uneven layer disposed on a second surface of the low reflection lens, and wherein the low reflection lens is disposed on an outermost side of the lens assembly among the plurality of lens on a light incident side.

The first uneven layer and the second uneven layer may include a plurality of ceramic particles.

The ceramic particles may include $ZrO_2$ particles.

The uneven layer may be configured to have a stepwise or serrated structure.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
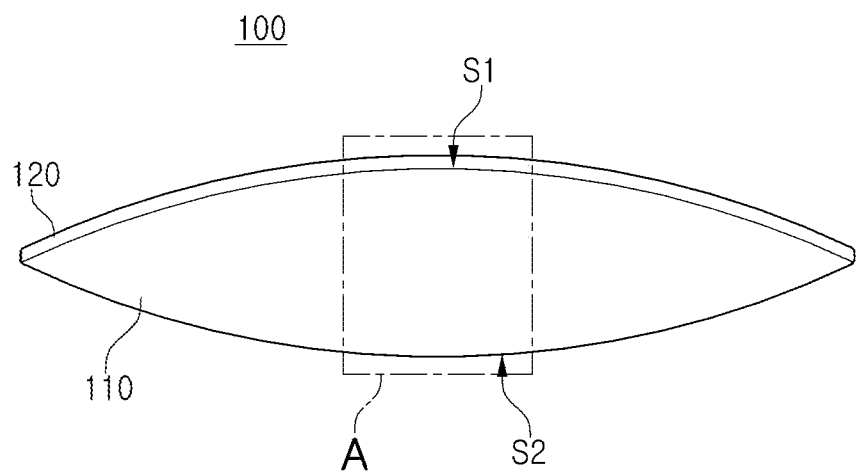
FIG. 1 illustrates a cross-section of an example lens, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

Figure 2:
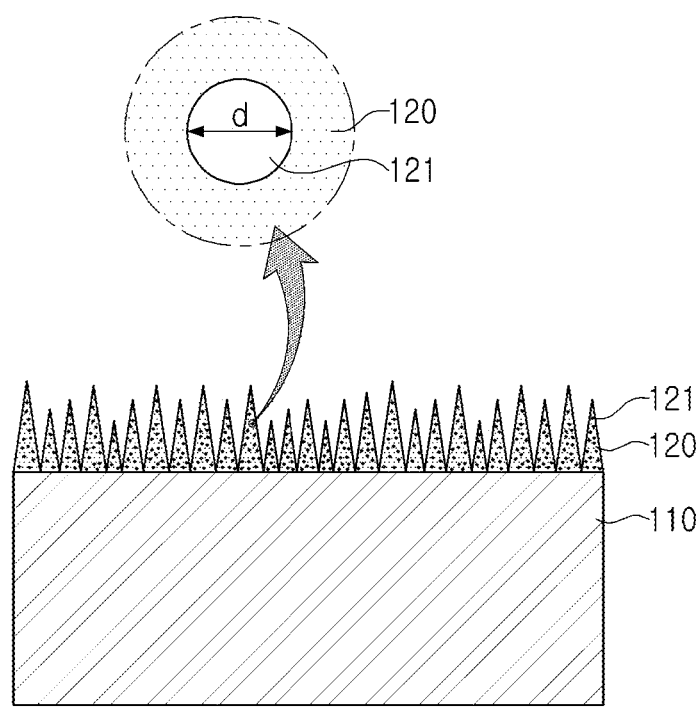
FIG. 2 illustrates an enlarged diagram of one region of the example lens in FIG. 1.
Figure 3:
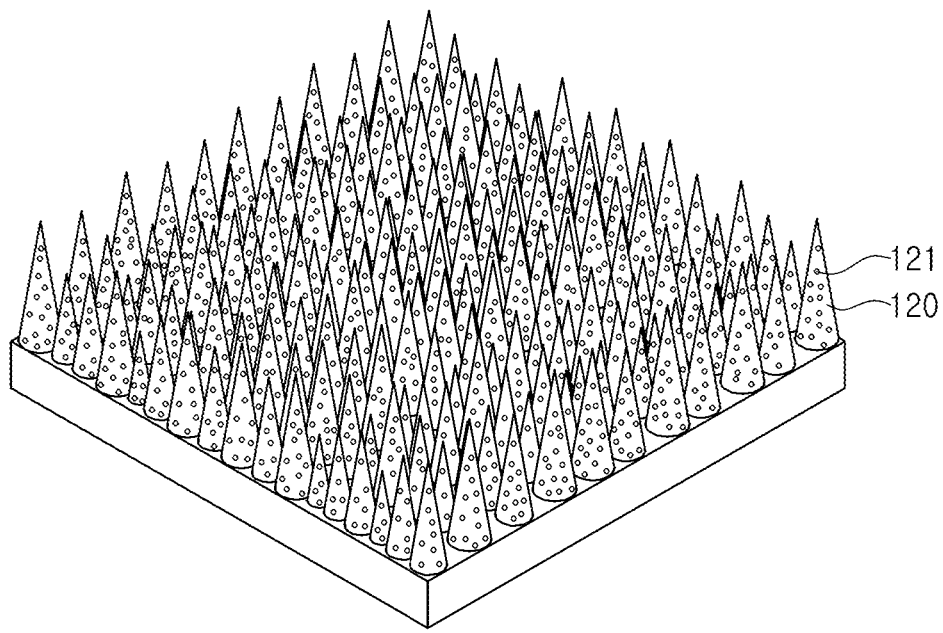
FIG. 3 illustrates a perspective diagram of an example of a serrated layer, in accordance with one or more embodiments.
Figure 4:
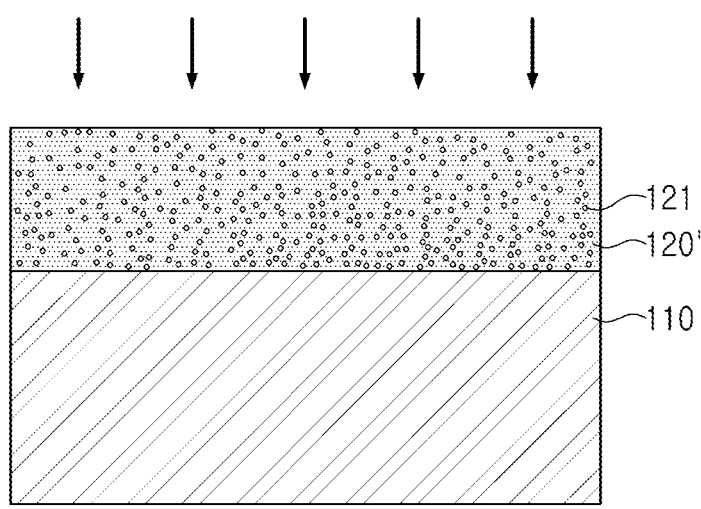
FIG. 4 illustrates a diagram of a portion of processes of manufacturing an example lens, in accordance with one or more embodiments.
Figure 5:
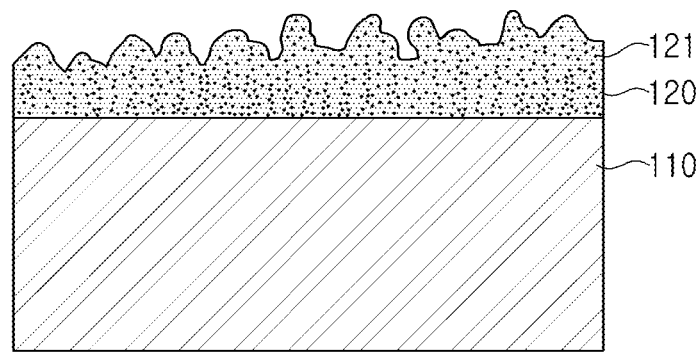
FIGS. 5, 6, and 7 illustrate cross-sections of an example lens, in accordance with one or more embodiments.
Figure 6:
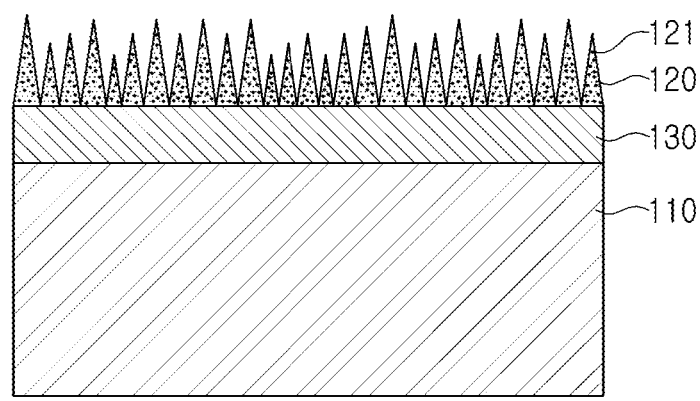
Figure 7:
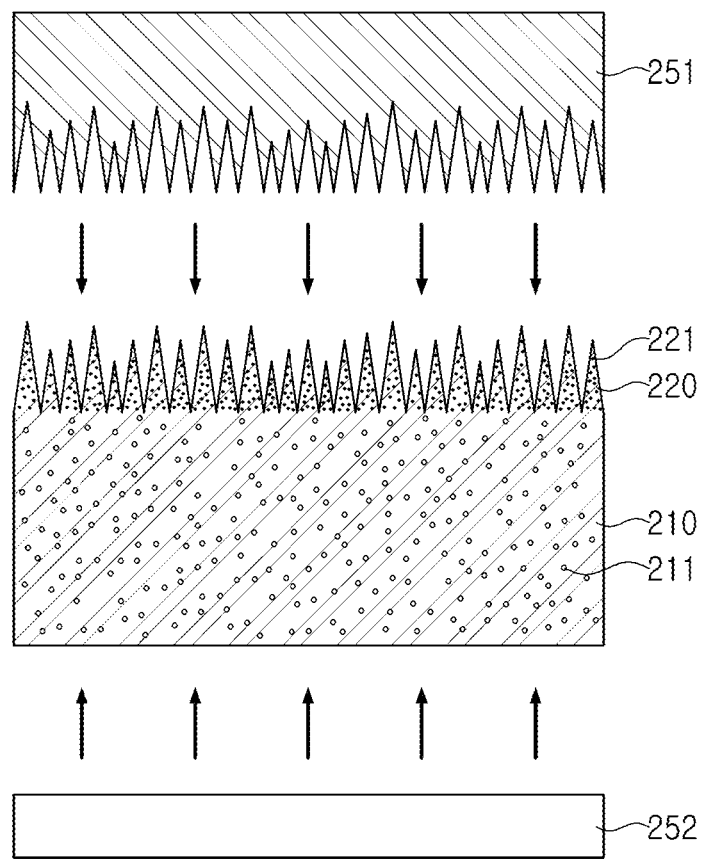

FIG. 1 illustrates a cross-sectional diagram of an example lens, in accordance with one or more embodiments. FIG. 2 illustrates an enlarged diagram of one region of the example lens in FIG. 1. FIG. 3 is a perspective diagram illustrating an example of a serrated layer. FIG. 4 is a diagram illustrating a portion of processes of manufacturing a lens according to an example. FIGS. 5 to 7 are cross-sectional diagrams illustrating an example lens, in accordirg with one or more embodiments.

Referring to FIGS. 1 and 2, an example lens 100, in accordance with one or more embodiments, may include a lens unit 110 and a serrated layer 120 formed or disposed on at least a portion of a surface of the lens unit 110 thereof. In an example, the serrated layer 120 may include a plurality of particles 121 that are injected into the serrated layer 120. In FIG. 2, the serrated layer 120 is emphasized as compared to the lens unit 110, and a size of the serrated layer 120 may be smaller than the illustrated example. Although the layer 120 is described as being a serrated layer, this is only an example, and in one or more examples, the layer 120 may have different uneven structures.

With regard to the lens unit 110, the shape or type of the lens unit 110 is not limited to any particular example, and may be implemented in the form of a lens implemented in optical devices such as, but not limited to, a camera module or device. Accordingly, the shape of the lens unit 110 may be modified into a shape other than the example illustrated in FIG. 1.

In a non-limited example, the lens unit 110 may be formed of a plastic resin including a resin component, and in an example, the plastic resin may include at least one of polycarbonate and polyolefin, but is not limited thereto. In an example, polyolefin may include at least one of a cycloolefin polymer and a cycloolefin copolymer. Additionally, in an example, the lens unit 110 may be configured as a glass lens.

A serrated layer 120 may be formed on at least a portion of a surface of the lens unit 110, and the serrated layer 120 may be implemented as a low-reflection structure. In an example, the serrated layer 120 may be formed on one surface S1 of the lens unit 110. However, this is only an example, and the serrated layer 120 may be formed only on a portion of one surface S1 of the lens unit 110, and additionally, the serrated layer 120 may be formed on both the first surface S1 and a second surface S2 of the lens unit 110.

There may be limitations in lowering reflectance through a generally used reflective coating layer on the surface of a lens, in the example embodiment, but reflectance of the lens 100 may be lowered through the serrated structure of the surface of the serrated layer 120, that is, for example, 0.2% or less of reflectance may be implemented. The reflectance may be lowered because a refractive index of the serrated layer 120 and a refractive index of air may be combined, such that an average refractive index may be lowered, and as incident light is scattered due to the serrated layer 120, reflectance may be lowered.

By implementing the Fresnel equation, the larger the difference in the refractive index of a dissimilar layer, the more reflection occurs on an interfacial surface, and as light reflected from the boundary surface overlaps and destructively interferes, reflectance may be lowered. According to this principle, the serrated layer 120 may preferably have a size similar to a wavelength of light, and accordingly, the serrated layer 120 may include a nano-serration structure.

Further, as illustrated in FIG. 3, the serrated layer 120 may include a plurality of conical structures having different sizes. When the serrated layer 120 has a conical structure, a refractive index on the surface of the serrated layer 120 may gradually change, and accordingly, reflectance of the serrated layer 120 may be further lowered. The serrated layer 120 may include a material layer having high reflectance in the visible ray region, that is, in an example, an $Al_2O_3$ layer, a $SiO_2$ layer, and the like, and specifically, the $Al_2O_3$ layer and the $SiO_2$ layer may be deposited by various deposition methods, such as, for example, atomic layer deposition (ALD) and physical vapor deposition (PVD), and an appropriate process to form irregularities on the surface, such as, for example, plasma etching, lithography, imprinting, or the like, may be applied to form serrations on the surface thereof. Additionally, in the example, the serrated layer 120 may include a plurality of conical structures, but the serrated structure may be formed in an irregular structure, that is, for example, a porous structure having a plurality of irregularly formed pores.

When the serrated structure, in particular, the nano-serration structure is formed on the surface of the serrated layer 120, durability may be relatively low such that a surface to be coated may be limited, and additionally, it may be difficult to treat the layer in the process of assembling the lens 100, and manufacturing costs may increase.

In the example embodiment, a structure in which a plurality of particles 121 are dispersed in the serrated layer 120 may be implemented to address the issue of durability degradation. In an example, the plurality of particles 121 may include nanoparticles, that is, in an example, a diameter d of the nanoparticles may be 10 nm or less. The diameter d of the nanoparticles may be an average value of diameters d of the nanoparticles in an image taken from one cross-section of the lens unit 110, that is, in an example, a cross-section of the serrated layer 120 taken in a thickness direction (a vertical direction with respect to the drawing), and reliability of the diameter d value may be increased by taking a plurality of the cross-sections with the same distance therebetween. The plurality of particles 121 may implement a material having excellent durability, and in an example, the plurality of particles 121 may include ceramic particles. More specifically, the ceramic particles may include $ZrO_2$ particles, as only examples. $ZrO_2$ may have high stability against light and heat, and as compared to other materials, such as, for example, $Al_2O_3$, $ZrO_2$ may have high hardness and tensile strength and excellent wear resistance. Additionally, as compared to $Al_2O_3$, $ZrO_2$ may have excellent mechanical performance such as a low coefficient of friction. Accordingly, when the plurality of particles 121 include $ZrO_2$ particles, the structural stability and durability of the serrated layer 120, and, also, of the lens 100 using the same may improve. The lens 100 having such excellent durability may be applied to an outermost layer lens in a lens assembly.

A refractive index of the serrated layer 120 may vary according to the content of the plurality of particles 121, and the plurality of particles 121 may be uniformly dispersed in the serrated layer 120. Additionally, the content of the plurality of particles 121 may be adjusted in consideration of mechanical performance, refractive index, or the like, of the serrated layer 120. In an example, the plurality of particles 121 may be dispersed in the serrated layer 120 in an amount of about 5-50 wt % in the entire serrated layer 120.

An example of a method of manufacturing the serrated layer 120 in which the plurality of particles 121 are dispersed will be described.

Referring to FIG. 4, to form a coating layer 120' on the surface of the lens unit 110, a coating solution including $ZrO_2$ particles having a diameter of about 2-10 nm may be prepared and may be applied to the surface of the lens unit 110. Specifically, the coating solution may be obtained by forming an $Al_2O_3$ component or a $SiO_2$ component (or both $Al_2O_3$ component and $SiO_2$ component) in a solvent containing ethanol, deionized water (DI water) by a sol-gel synthesis method and mixing the solution with $ZrO_2$ particles, and the solvent may be mixed after the $Al_2O_3$ component or the $SiO_2$ component (or both the $Al_2O_3$ component and the $SiO_2$ component) is formed. Additionally, the $ZrO_2$ particles may be added to the coating solution in a mixed state in a solvent including ethanol, mole, organic acid, or the like, and may have a surface-modified structure to be uniformly dispersed in the coating solution. The coating solution obtained as above may be applied to the surface of the lens unit 110 by a method such as, but not limited to, dip coating or spin coating, and may be annealed at a temperature of about 60-150° C. to volatilize the solvent, thereby forming the coating layer 120'. The coating layer 120' may be formed to have a thickness of about 10-500 nm. To uniformly maintain optical properties such as transmittance of the lens 100, the plurality of particles 121 may be uniformly dispersed in the serrated layer 120, and by implementing the manufacturing method described above, aggregation of particles may be prevented, and the uniformly dispersed structure of the plurality of particles 121 may be effectively implemented.

After forming the coating layer 120', a serrated structure may be formed on the surface of the lens unit 110 thereof, and in an example, a conical structure may be implemented through plasma etching, wet etching, and the like, as described above. Additionally, a porous and irregular serrated structure may be formed on the surface of the coating layer 120', which may be an example of a method of forming the serrated layer 120 having an irregular serrated structure as illustrated in FIG. 5, and by reacting the coating layer 120' in deionized water at about 50-90° C. for about 1 hour, an irregular serrated structure may be formed. Additionally, the irregular serrated structure may be formed by reacting the coating layer 120' with an aqueous solution including a stabilizer such as phosphoric acid and citric acid.

One or more examples will be described with reference to FIGS. 6 and 7. In the example illustrated in FIG. 6, an adhesive layer 130 disposed between the lens unit 110 and the serrated layer 120 may be further included. Accordingly, the serrated layer 120 and the lens unit 110 may be more stably coupled to each other. The adhesive layer 130 may include at least one of, as only examples, $SiO_2$, $TiO_2$, and a silane compound.

Thereafter, as in the example illustrated in FIG. 7, the lens unit 210 and the serrated layer 220 may be formed in an integrated structure. The serrated layer 220 may include a plurality of particles 221, and the lens unit 210 may also include a plurality of particles 211. The lens having the integrated structure may be implemented by an imprinting method as illustrated in FIG. 7. Specifically, by imprinting a composite material in which $ZrO_2$ particles are dispersed in a transparent thermoplastic resin using an upper mold 251 and a lower mold 252, the lens in which the lens unit 210 and the serrated layer 220 have the integrated structure may be obtained. With regard to a lens having such an integrated structure, the serrated layer 220 having a low reflection structure may be implemented without a coating process by imprinting a composite material in which nanoparticles are dispersed in a separate coating process, and as the lens unit 210 and the serrated layer 220 are formed in an integrated structure, the lens may have a very high level of structural stability.

Figure 8:
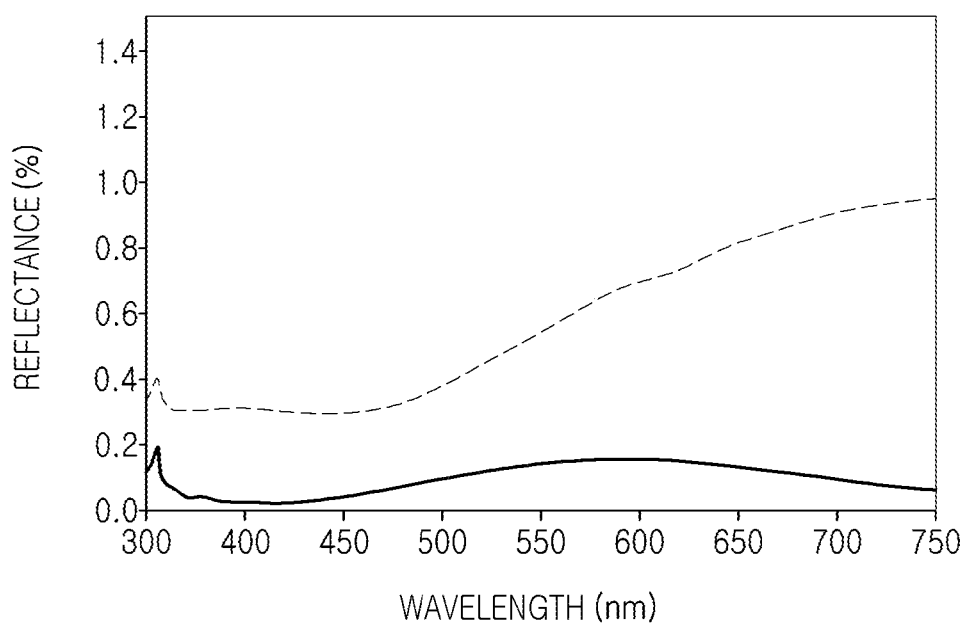
FIG. 8 illustrates graphs comparing the reflectance in lenses between an example embodiment and a comparative example.

FIG. 8 is a graph (solid line) of reflectance in a lens implementing the serrated layer 120 including a plurality of particles 121 dispersed therein, and a comparative example (dotted line) may indicate a lens having a serrated layer not including a plurality of particles. As indicated in the results of experiments in FIG. 8, in the lens in which the plurality of particles 121 are dispersed in the serrated layer 120, reflectance was lowered to 0.2% or less in most of the visible light region, and differently from the above example, in the lens according to the comparative example in which particles were not employed, reflectance increased in the overall wavelength band, and in particular, reflectance had a tendency to significantly increase in the long wavelength band.

Figure 9:
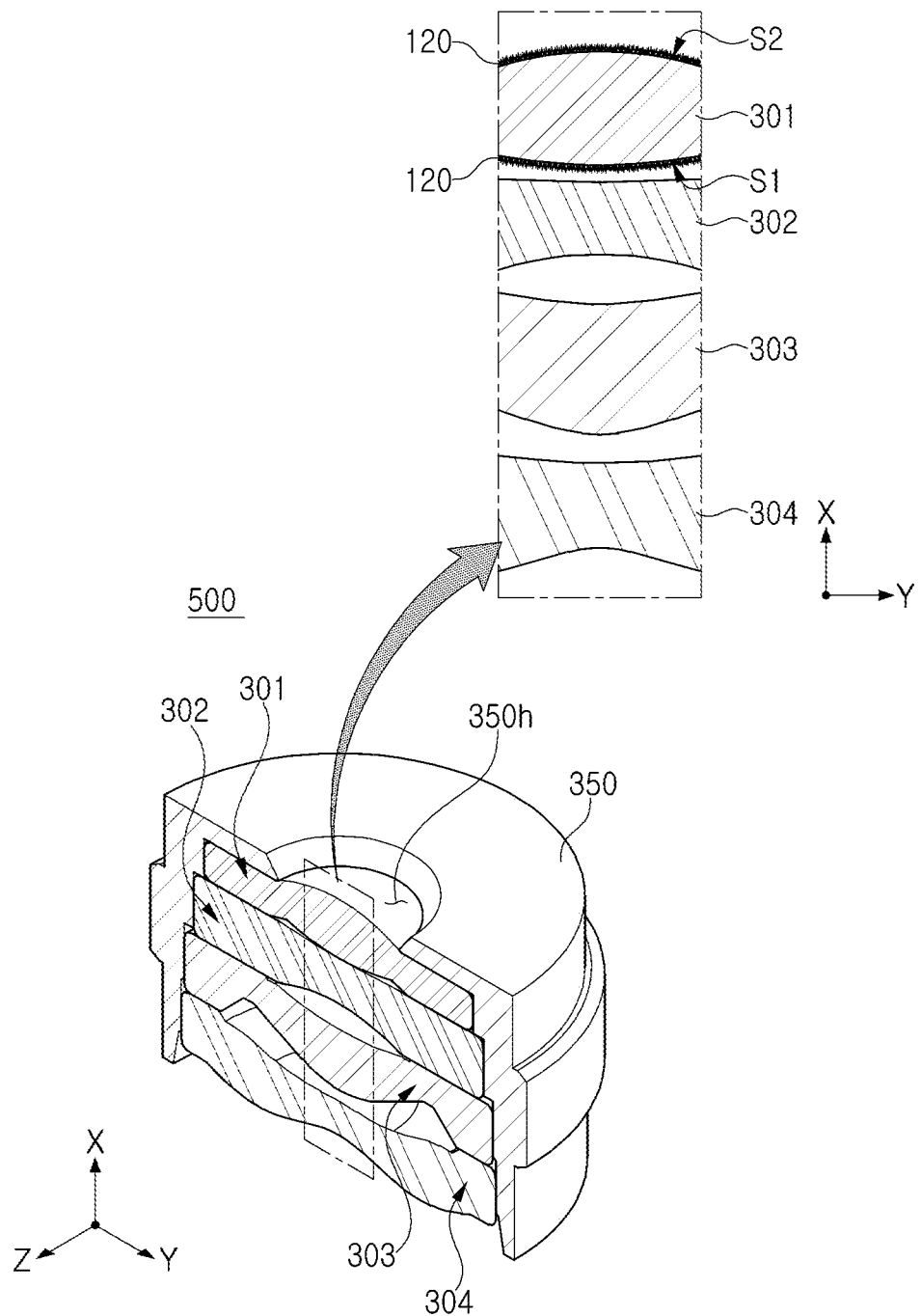
FIG. 9 illustrates a perspective diagram of an example lens assembly.
Figure 10:
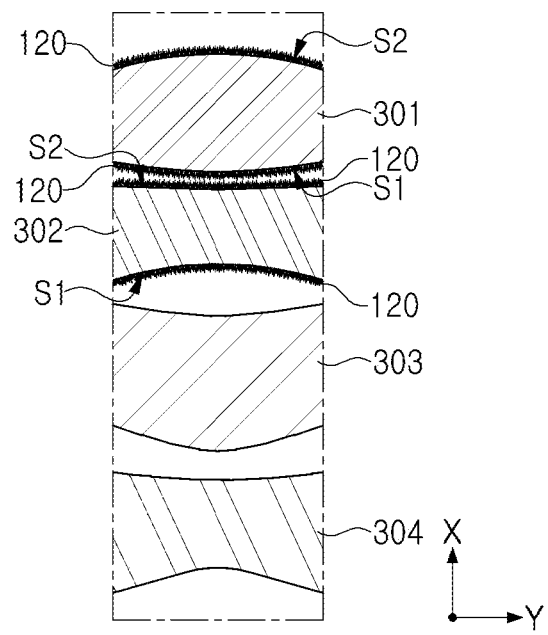
FIGS. 10 and 11 illustrate cross-sectional diagrams of an example of a plurality of lenses implemented in an example lens assembly, in accordance with one or more embodiments.
Figure 11:
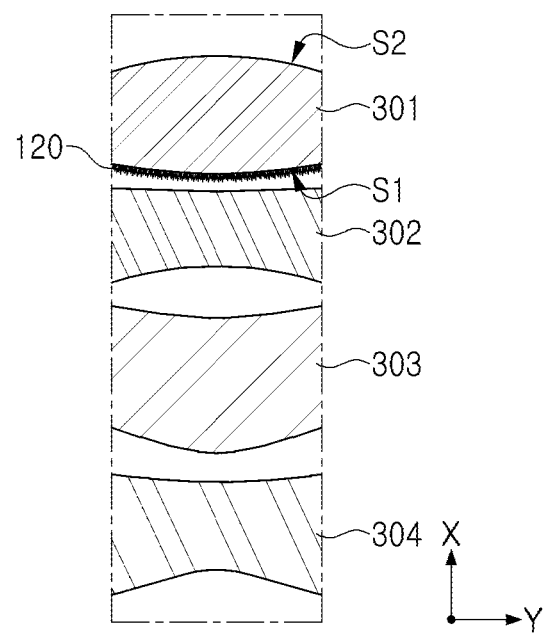

FIG. 9 is a perspective diagram illustrating an example lens assembly. FIGS. 10 and 11 are cross-sectional diagrams illustrating an example of a plurality of lenses implemented in an example lens assembly.

Referring to FIG. 9, the lens assembly 500 may include at least one lens 301-304. In the non-limiting example, the lens assembly 500 may include four lenses 301-304, and the number of the lenses 301-304 or the shape of each lens 301-304 may be varied depending on an implementation or size condition. The lens assembly 500 may include a lens barrel 350 having a lens hole 350h in addition to the plurality of lenses 301-304. The lens barrel 350 may have a hollow cylindrical shape, and a lens hole 350h to transmit light may be formed through one surface of the lens barrel 350. At least one lens 301 among the plurality of lenses 301-304 may implement the low-reflection lens described in the aforementioned example. That is, as illustrated in FIG. 9, the low-reflection lens 301 may be formed on the lens unit, and a first surface S1 and a second surface S2 of the low-reflection lens 301 may respectively include a serrated layer 120 including a plurality of particles dispersed therein.

In an example, the low-reflection lens 301 may be disposed on an outermost side of the lens assembly 500 among the plurality of lenses 301-304 on a light incident side, that is, in the optical axis direction (X-direction in the drawing). Since reflectance and durability of the lens 301 disposed on the outermost side among the plurality of lenses 301-304 may greatly affect overall reflectance and durability of the lens assembly 500, as in the example, by implementing the reflective lens 301 on an outermost side of the lens assembly 500, the effect of reducing reflectance of the lens assembly 500 and further, the effect of improving durability may improve.

Referring to FIG. 10, reflectance of the lens assembly 500 may be further reduced by implementing a larger number of low-reflection lenses in the lens assembly 500 if desired. That is, a plurality of low reflection lenses 301 and 302 may be provided, and in this example, the plurality of low reflection lenses 301 and 302 may be disposed on the outermost side of the lens assembly 500 in the optical axis direction.

Referring to FIG. 11, in the low-reflection lens 301, the serrated layer 120 may be formed on a first surface S1 and may not be formed on a second surface S2. In this example, the low-reflection lens 301 may be disposed such that the second surface S2 without the serrated layer 120 may be disposed on an external side in the optical axis direction (X direction). That is, the second surface S2 without the serrated layer 120 may be disposed on the outermost side, and accordingly, structural stability of the lens assembly 500 may further improve.

Figure 12:
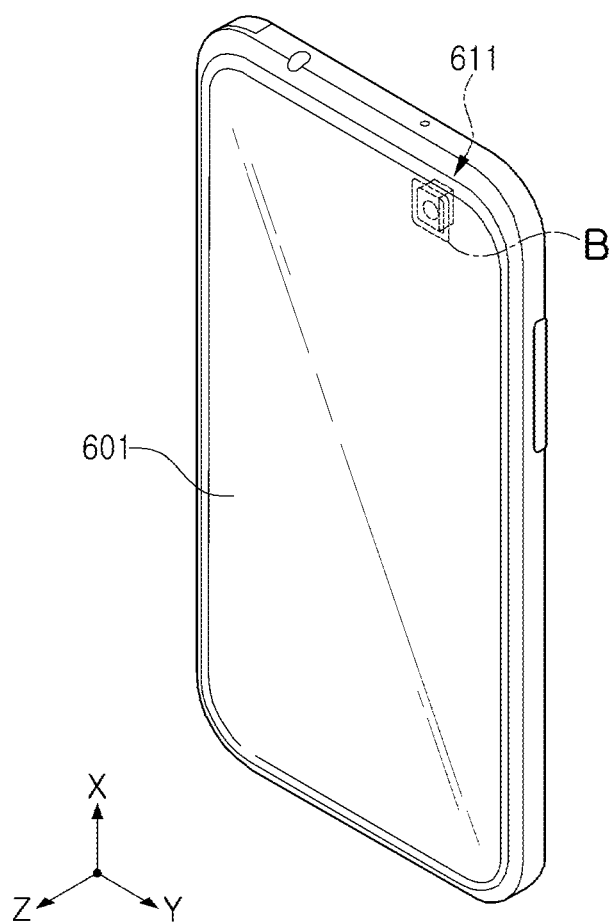
FIGS. 12 and 13 are perspective diagrams illustrating an example mobile electronic device, illustrating a front portion and a rear portion, respectively, in accordance with one or more embodiments.
Figure 13:
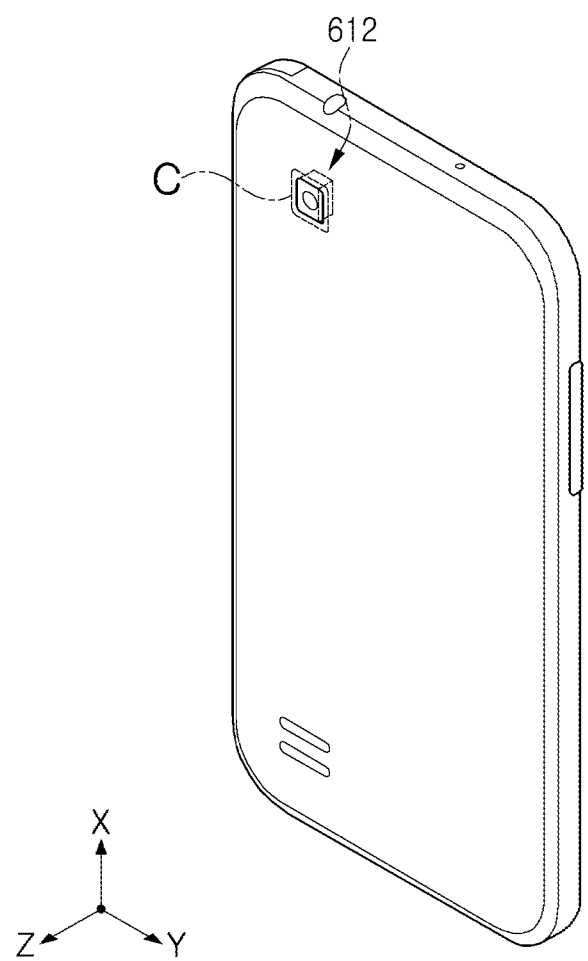
Figure 14:
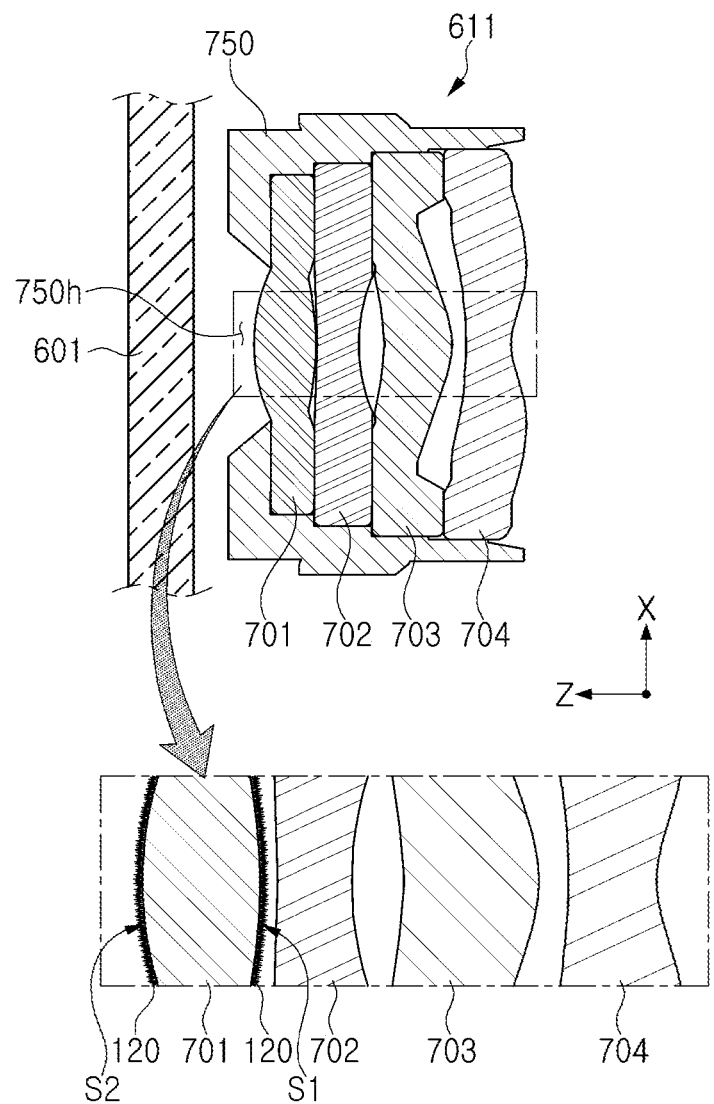
FIGS. 14 and 15 illustrate enlarged cross-sectional diagrams of a region around the example lens assembly in FIGS. 12 and 13.
Figure 15:
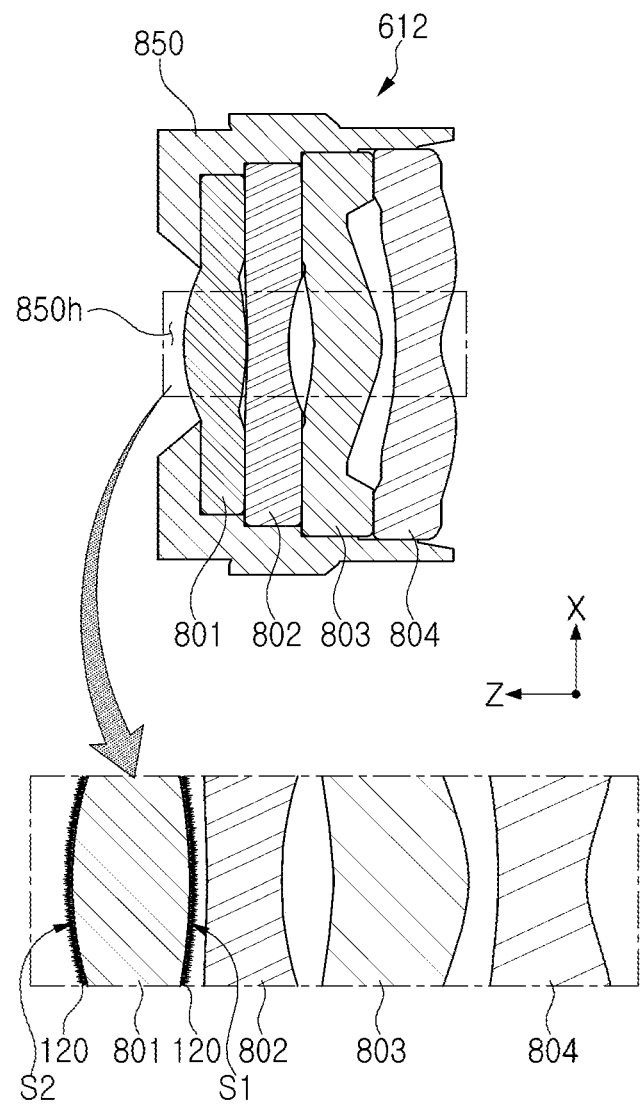

FIGS. 12 and 13 are perspective diagrams illustrating an example mobile electronic device, illustrating a front portion and a rear portion, respectively. FIGS. 14 and 15 are enlarged cross-sectional diagrams illustrating a region around the lens assembly in FIGS. 12 and 13. In an example, the mobile electronic device 600 may be provided in the form of various electronic devices such as, but not limited to, a smartphone, a tablet PC, and a notebook PC, and in the example, a smartphone will be described as an example.

The mobile electronic device 600 may include a display 601, a first lens assembly 611, and a second lens assembly 612 as main components. However, if desired, only one of the first and second lens assemblies 611 and 612 may be implemented. In addition to the display 601 and the lens assemblies 611 and 612, as the other main elements (e.g., a processing device, a communication device, a touch sensor, or the like,) included in the mobile electronic device 600, typically implemented components may be used, and a detailed description thereof will not be provided.

The first and second lens assemblies 611 and 612 may have the structure described with reference to FIG. 9, and specifically, referring to FIG. 14, the first lens assembly 611 may include a lens barrel 750 having lens holes 750h in addition to a plurality of lenses 701-704. At least one lens, for example, lens 701 among the plurality of lenses 701-704 may implement the low-reflection lens according to the aforementioned example. That is, the low-reflection lens 701 may be formed on a lens unit, and a first surface S1 and a second surface S2 of the low-reflection lens 701 and may respectively include the serrated layer 120 including a plurality of particles dispersed therein. In this example, the low-reflection lens 701 may be disposed on the outermost side of the first lens assembly 611 among the plurality of lenses 701-704 in the direction in which light is incident, that is, the optical axis direction (Z direction in the drawing).

Similarly, referring to FIG. 15, the second lens assembly 612 may include a lens barrel 850 having a lens hole 850h in addition to the plurality of lenses 801-804. At least one lens 801 among the plurality of lenses 801-804 may implement the low-reflection lens described in the aforementioned example. That is, the low-reflection lens 801 may be formed on the lens unit and a first surface S1 and a second surface S2 of the low-reflection lens 801 may respectively include a serrated layer 120 including a plurality of particles dispersed therein. In this example, the low reflection lens 801 may be disposed on an outermost side of the second lens assembly 612 among the plurality of lenses 801-804 in the direction in which light is incident, that is, in the optical axis direction (Z direction in the drawing).

As illustrated, the first lens assembly 611 may be covered by the display 601, and in an example, the first lens assembly 611 may be covered by a tempered glass portion of the display 601. However, when the tempered glass covers the first lens assembly 611, the tempered glass may not need to be a portion of the display 601. When the first lens assembly 611 is covered by the display 601 as above, the amount of light incident to the lens may be reduced, such that reflectance of the first lens assembly 611 may greatly affect performance of the camera module.

In other words, as for the front portion of the mobile electronic device 600, the first lens assembly 611 may be covered by the display 601, which corresponds to an under display camera (UDC) structure. Although the UDC structure may reduce the processing of the camera hole, since an additional tempered glass may be disposed on the camera to implement the UDC structure, the amount of light incident to the camera may be reduced, which may cause performance degradation. Therefore, when the reflectance of the lens is high in the UDC structure, performance of the camera module may be greatly reduced, and as in the example, by disposing the low-reflection lens 701 on the incident side, that is, most adjacent to the display 601, the effect of reducing reflectance of the first lens assembly 611 may increase, and accordingly, performance of a camera module including the same may improve. Meanwhile, in the aforementioned example, the first lens assembly 611 may be covered by the display 601. However, in example embodiments, the second lens assembly 612 may also be covered by an optical element which may cause loss of the amount of light, that is, for example, tempered glass, and in this case, the effect of reducing reflectance of the second lens assembly 612 may be important. In addition to the example embodiment in FIG. 9, the structures of the lens assembly 500 in FIGS. 10 and 11 may also be applied to the mobile electronic device described in the aforementioned example.

According to the aforementioned example embodiments, the lens may include a reflective layer having low reflectance and excellent durability, thereby reducing flare.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lens, comprising:
a lens unit; and
a serrated layer disposed on at least a portion of a surface of the lens unit,
wherein the serrated layer comprises a plurality of particles dispersed therein, and
wherein the serrated layer comprises a nano-serration structure.

2. The lens of claim 1, wherein the serrated layer comprises a plurality of conical structures having different sizes.

3. The lens of claim 1, wherein the serrated layer comprises an irregularly shaped serrated structure.

4. The lens of claim 1, wherein the serrated layer comprises a porous structure.

5. The lens of claim 1, wherein the plurality of particles comprise nanoparticles.

6. The lens of claim 1, wherein the plurality of particles comprise ceramic particles.

7. The lens of claim 6, wherein the ceramic particles comprise $ZrO_2$ particles.

8. The lens of claim 1, further comprising:
an adhesive layer disposed between the lens unit and the serrated layer.

9. The lens of claim 8, wherein the adhesive layer comprises at least one of $SiO_2$, $TiO_2$, and a silane compound.

10. The lens of claim 1, wherein the lens unit and the serrated layer are configured to be integrated with each other.

11. The lens of claim 1, wherein the serrated layer comprises at least one of $Al_2O_3$ and $SiO_2$.

12. A lens assembly comprising:
at least one lens including a lens unit,
wherein at least one of the at least one lens is configured as a low-reflection lens,
wherein a serrated layer comprising a plurality of particles dispersed therein is disposed on at least a portion of a surface of the lens unit, and wherein the low-reflection lens is disposed on an outermost side of the lens assembly among the at least one lens in an optical axis direction.

13. The lens assembly of claim 12, wherein the low-reflection lens comprises a first surface and a second surface opposing the first surface, and the serrated layer is disposed on the first surface and is not disposed on the second surface.

14. The lens assembly of claim 13, wherein the low-reflection lens is disposed such that the second surface is disposed on an external side of the lens assembly in the optical axis direction.

15. The lens assembly of claim 12, further comprising a plurality of the low-reflection lenses, and the plurality of the low-reflection lenses are disposed on an outermost side of the lens assembly among the at least one lens in an optical axis direction.

16. A mobile electronic device, comprises:
a display; and
a lens assembly,
wherein the lens assembly comprises at least one lens including a lens unit,
wherein at least one of the at least one lens is configured as a low-reflection lens,
wherein a serrated layer comprising a plurality of particles dispersed therein is disposed on at least a portion of a surface of the lens unit, and
wherein the low-reflection lens is disposed on an outermost side of the lens assembly in an optical axis direction of the at least one lens.

17. The mobile electronic device of claim 16, wherein the lens assembly is covered by the display.

18. The mobile electronic device of claim 17, wherein the lens assembly is covered by a tempered glass portion of the display.

19. A lens assembly, comprising:
a plurality of lens;
wherein at least one of the plurality of lens is configured as a low reflection lens,
wherein the low reflection lens comprises a first uneven layer disposed on a first surface of the low reflection lens, and a second uneven layer disposed on a second surface of the low reflection lens, and
wherein the low reflection lens is disposed on an outermost side of the lens assembly among the plurality of lens on a light incident side.

20. The lens assembly of claim 19, wherein the first uneven layer and the second uneven layer comprise a plurality of ceramic particles.

21. The lens assembly of claim 20, wherein the ceramic particles comprise ZrO2 particles.

22. The lens assembly of claim 19, wherein the uneven layer is configured to have a stepwise or serrated structure.

* * * * *